Sept. 19, 1950          A. C. PETERSON          2,522,890

FUEL METERING, DISTRIBUTION, AND CONTROL MEANS

Filed Aug. 22, 1945          4 Sheets-Sheet 1

Inventor

Adolph K. Peterson

Sept. 19, 1950          A. C. PETERSON          2,522,890

FUEL METERING, DISTRIBUTION, AND CONTROL MEANS

Filed Aug. 22, 1945          4 Sheets-Sheet 3

Inventor
Adolph Peterson.

Sept. 19, 1950  A. C. PETERSON  2,522,890
FUEL METERING, DISTRIBUTION, AND CONTROL MEANS
Filed Aug. 22, 1945  4 Sheets-Sheet 4

Inventor
Adolph C. Peterson.

Patented Sept. 19, 1950

2,522,890

UNITED STATES PATENT OFFICE 2,522,890

FUEL METERING, DISTRIBUTION, AND CONTROL MEANS

Adolphe C. Peterson, Edina, Minn.

Application August 22, 1945, Serial No. 611,987

9 Claims. (Cl. 103—5)

1

My invention relates to fuel metering and injection means for internal combustion engines, and is called Fuel Metering, Distribution and Control Means.

The principal objects of my invention are to provide a form of fuel metering and distribution means for internal combustion engines, which means shall be simple in construction, reliable and accurate in operation, and efficient in use. A chief object is to provide a form of fuel metering and distribution means for fuel injection engines or engines in which fuel is metered for each engine cylinder or combustion chamber, and to provide such a means utilizing a novel system of metering of the fuel and pressure injection or delivery of the fuel which is inherently enabled to equalize the fuel distribution. An object is to provided for such a fuel system a metering means which is dependent for its accuracy on only one single part and which therefore is more easily constructed and does not require time wasting adjustments to provide the required accuracy in equality of distribution. An object is to provide this system and means in a compact single unit which may be manufactured and dispensed to manufacturers of engine assemblies. An object is especially to provide such a means in a form which is especially adapted to the higher speed engines and also to the smaller types of engines such as automotive engines for automobiles and trucks and smaller marine units, because of its accuracy and maintained equality of distribution. An object is also to provide a control means for the control of the quantity of fuel supply to an engine utilizing a pressure delivery of fuel. An object is to provide such a means which shall be adapted to use with Diesel type engines, semi-Diesel type engines, spark ignition engines, air and fuel mixture engines of the Otto cycle type, and generally for internal combustion engines.

The principal devices and combinations of devices comprising my invention, are as hereinafter described and as defined in the claims. In the accompanying drawings, which illustrate my invention, like characters refer to like parts throughout the several views. Referring to the drawings:

Figure 1:
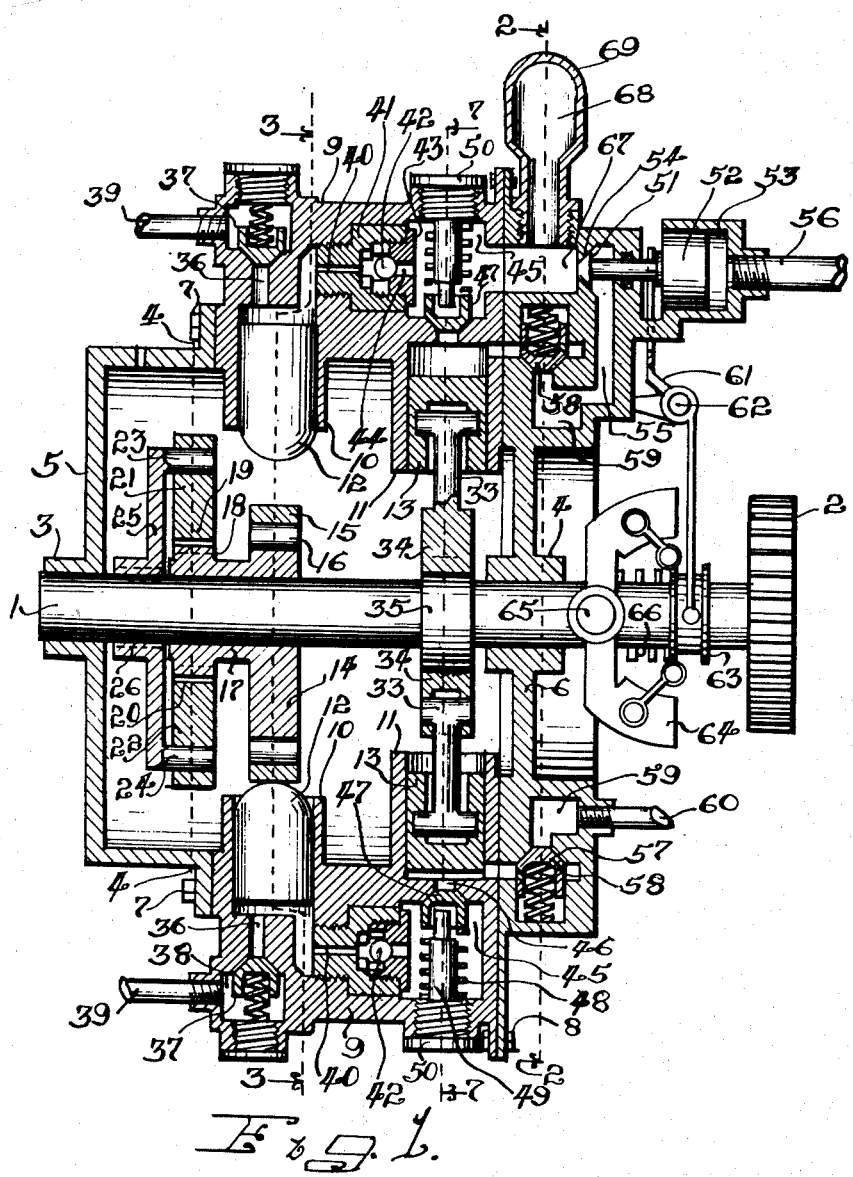
Figure 1 is a view in vertical section through the principal elements of a unit comprising my invention, this section being on a plane passing vertically through the axis of the operating shaft of the unit and being a section on the lines 1—1 of Figures 2, 3, 4, some parts being in full side elevation.
Figure 2:
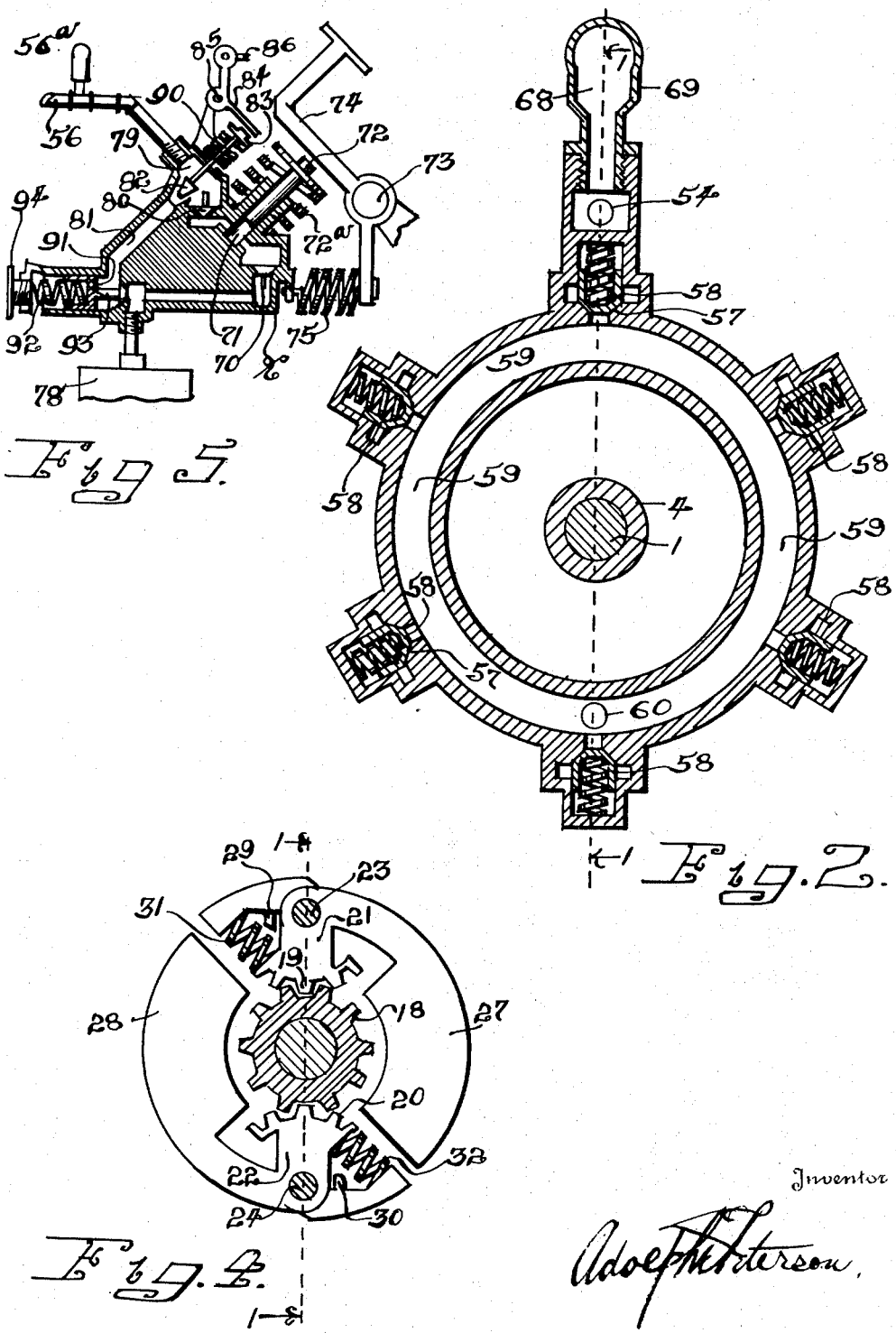
Figure 2 is a view in vertical section at right

2 angles to the section of Figure 1, and on the line 2—2 of Figure 1.

Figure 3:
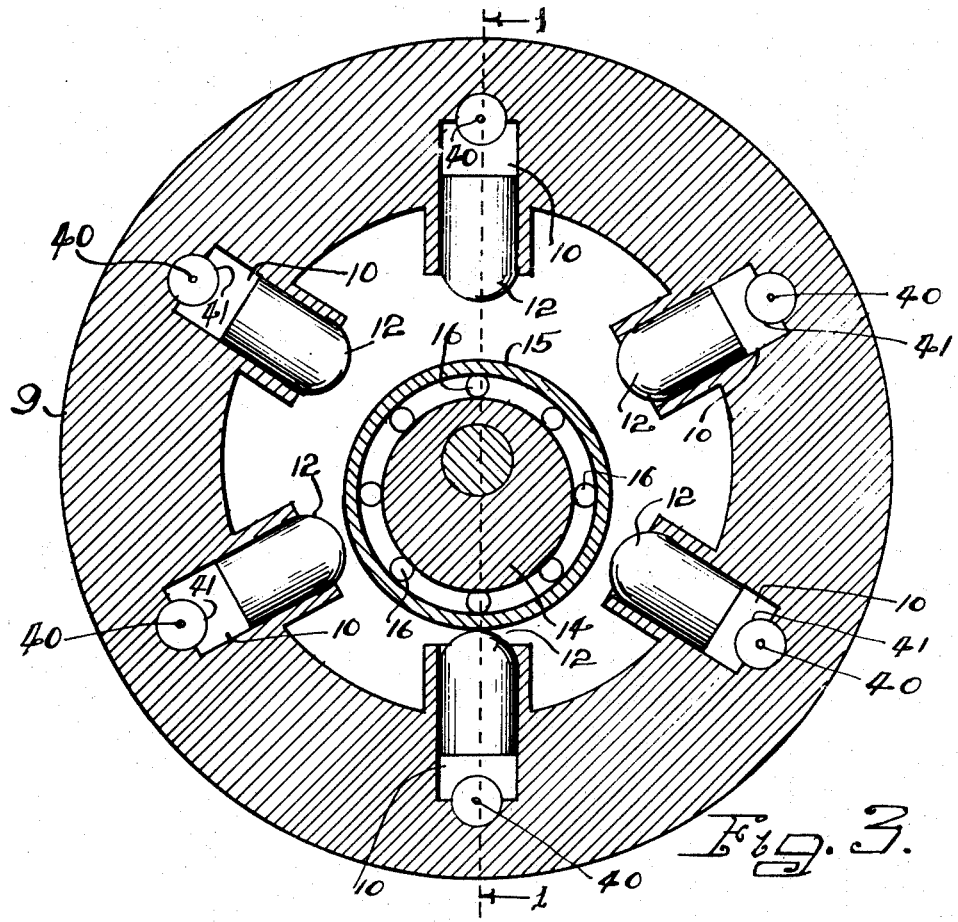

Figure 3 is a view in vertical cross section transversely of and at right angles to the section of Figure 1, and on the line 3—3 of Figure 1, this line being an angled line as shown in Figure 1, the section showing the major portion, centrally on one plane, and the outlying parts circumferentially on a plane slightly rightwardly of the main line, as shown in Figure 1, so as to show all the metering devices in association with their pressure plungers.

Figure 4 is a section on a vertical plane, transversely of and at right angles to the plane of Figure 1, on the line 4—4 of Figure 1, and showing only the automatic advancing means as applied to the plunger operating means and its driving shaft.

Figure 5 is a section vertically through a manually operated pressure control means for control of the quantity of fuel distributed by the means shown in Figures 1, 2, 3, 4, in detail.

Figure 6:
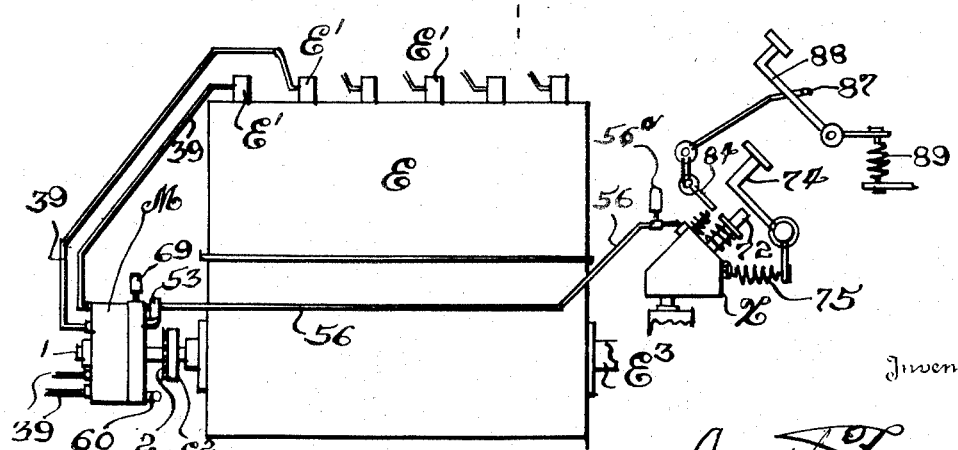

Figure 6 shows on a very much reduced scale an application of my device for fuel metering and distributing, and also the control means for manual control, as applied to an internal combustion engine having injection nozzles, one for each engine cylinder.

Figure 7:
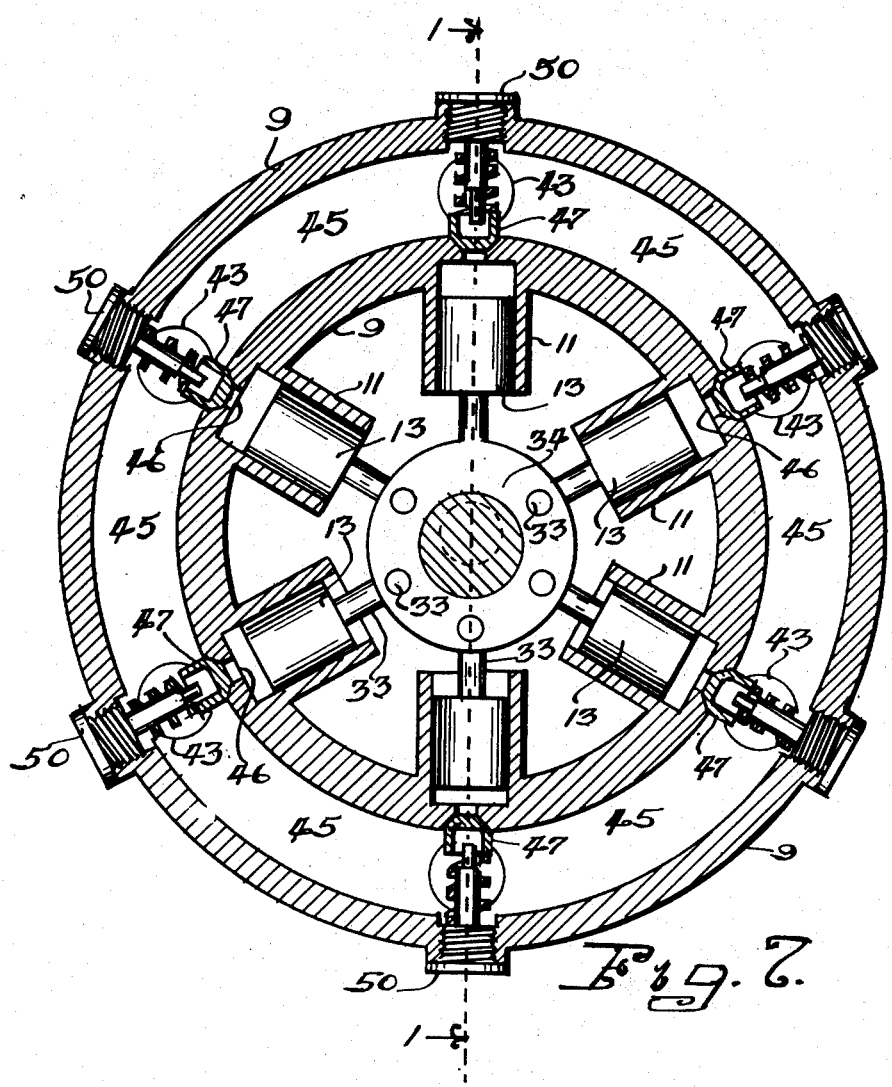

Figure 7 is a vertical section at right angles to that of Figure 1 on the line 7—7 of Figure 1.

Referring first to Figures 1 to 4 both inclusive, which show only the fuel metering and distribution unit, as distinguished from the associated control unit and the associated engine, the numeral 1 indicates the operating shaft of this unit, the numeral 2 an attached spur gear or other element on the end of the shaft, for driving of the shaft in any association with other spur gears or an internal spur gear, as hereafter mentioned. The shaft 1 is rotatably mounted in the bearings 3 and 4, respectively, the former of which is formed in a cover plate 5 and the latter of which is formed in the cover plate 6. The two last named members, cover plates 5 and 6, are formed to be bolted by means of bolts 7 and 8, respectively, on the ends of the pump and plunger casing 9, in such manner that the shaft 1, trunnioned therein, is mounted centrally of and axially of the pump and plunger casing 9.

The pump and plunger casing 9 is preferably formed by casting or forging and machining, of steel or an alloy of a metal such as bronze, which is sufficiently durable for the purpose. The pump and plunger casing 9 has formed therein in one plane transversely of the axis of shaft 1, and at right angles thereto, a number of plunger cylinders 10, the number shown being six, each of these cylinders being disposed with its axis coincident with one radius of the circle in that plane about the axis of shaft 1. The pump and plunger casing 9 also has formed therein in one plane transversely of the axis of shaft 1, and at right angles thereto, a number of pump cylinders 11, the number shown being six and not necessarily the same number as the number of cylinders 10, each of these cylinders 11 being disposed with its axis coincident with one radius of the circle in that plane about the axis of shaft 1. The plane of the cylinders 11 is as close to the plane of cylinders 10 as the construction and other elements involved, will permit.

The plunger cylinders 10 have reciprocable in each, a fuel pressure plunger, or pressure creating element 12, each of these plungers being equivalent to the others in external diameter and other dimensions, although not necessarily so.

The pump cylinders 11 have reciprocable in each, a pump piston 13, each of these pump pistons 13, being equivalent to the other in external diameter and other dimensions, although, not necessarily so. The members 12 and their cylinders, are distinguished by the word plunger, for distinction in description, from the designation of the pump pistons 13. The plungers 12 are each very accurately fitted in their cylinders 10 for reciprocation therein, so that they slide readily under pressure on them axially either way, but they are preferably so fitted that there is the slightest amount of leakage practicable around their sides between any of them and its cylinder wall associated, so that leakage between a plunger 12 and the wall of its cylinder 10 will not appreciably affect the fuel distribution. This may be accomplished by very careful grinding and fitting of the plunger to the cylinder, or by any packing means which may be used on the plunger, such as piston rings (not shown).

The plungers 12 have their inner ends, rounded as shown, and none of them have any permanent connection with or attachment to its operating means. The plungers 12 have a relatively very short stroke, and they lie in the same plane transversely of the axis of shaft 1, as an eccentric 14 and bearing race 15 mounted thereon by means of rollers 16 internally of the bearing race 15. The bearing race 15 is perfectly round, and is always held eccentrically of shaft 1 by means of the rollers 16 mounted to roll on the eccentric 14 as an inner race for the rollers 16. The eccentric 14 is formed on a hub 17 which is mounted to have small oscillation on the shaft 1. The hub 17 has fixed on its opposite end a small spur gear 18 which is in cooperation with the spur gear sectors 19 and 20 of two governor arms 21, 22, respectively, the latter being oscillably mounted on pivots 23, 24 fixed on the spanner member 25, the latter being fixed by keys 26 or bolts to the shaft 1 to revolve permanently fixed therewith. The governor arms 21, 22 have formed therewith the governor weights 27, 28, respectively, these being heavy, so they will have strong control action.

Lugs 29, 30 on the spanner member 25 prevent movement beyond a limited position in one way of the hub 17 and eccentric 14 and each governor arm 21, 22 is pulled by the tension of a tension spring 31, and 32, respectively, in that direction, while the governor arm 21, 22 may be impelled in the opposite direction radially by the centrifugal action upon weights 27, 28, to move the hub 17, and attached eccentric 14, a short degree distance, for rotational advancement of the relative position of eccentric 14 to shaft 1. This advancement may not be more than say fifteen to thirty degrees, and need not occur until high speed of shaft 1 is reached.

The pump pistons 13 are each connected flexibly by connecting rods 33 to a crank wrist member 34 which is formed with one of the rods 33. The wrist member 34 is mounted on an eccentric 35 for rotation of the latter within it. The eccentric 35 is formed on or firmly attached to shaft 1 for permanent rotation therewith.

The plunger cylinders 10 have each a port 36 delivering as controlled by check valve 37 to valve chamber 38 and thereby to an individually related distribution conduit 39, each of the latter and its associated valve chamber 38 being isolated from the others. Each plunger cylinder 10 may receive liquid fuel from a metering port 40, individually associated with it, and formed in an individually associated metering nozzle 41. Each of the latter is screwed as shown, in Fig. 1, into the metal of the casing 9, and has associated with and assembled with it, as a unit, a small ball check valve or other type check valve 42 held by cap 43, to permit easy flow at any time to metering port 40, associated with it. The passages around check valve 42 and the passage 44 in cap 43, are relatively much larger than the metering port 40, so that at no time is the flow restricted by the passages around check valve 42 and the passage 44. Each metering port unit, as above described, delivers fuel to an individually associated plunger cylinder 10, but all the metering units are placed to receive liquid fuel from a common annular fuel chamber 45 which is formed in the casing 9, and receives fuel as pumped by the pump pistons 13, by way of the individual ports 46, as controlled by the individual check valves 47, each of which is yieldably closed by its associated coil spring 48, and each of which is held in its relative location by the associated member 49, the latter being formed with the associated screw cap 50. The annular fuel chamber 45 has discharge only by way of the six metering units through their individual metering ports 40, except when the pressure of liquid fuel in the annular chamber 45 exceeds the pressure as permitted by a control means comprised of a needle valve, or control valve 51 fixed to move with a control piston 52, the latter being reciprocable in the pressure control cylinder 53, to be normally held to close the port 54 delivering from common chamber 45 to a by-pass conduit 55, by pressure of a control liquid as oil in the control cylinder 53, that pressure of control liquid being as provided by the control conduit 56 and the control means as hereafter described.

The pump cylinders 11 each may independently receive liquid fuel by way of a port 57 as controlled by check valve 58, from an annular fuel chamber 59 formed in cover plate 6, as is also the by-pass conduit 55. The latter delivers, when the valve 51 is opened, back to annular fuel chamber 59, to release pressure of fuel from common fuel chamber 45, under the control of the control means. The annular fuel chamber 59 freely receives liquid fuel by way of the fuel supply conduit 60, and the latter may be supplied with liquid fuel by any means as a gravity supply or any low pressure fuel supply pumping means.

The control piston 52 and with it the control valve 51, may be moved rightwardly in Figure 1, to open the control valve from its port, by the associated end of a control lever 61, fulcrumed on pivot 62, the other end of which is adapted to be pulled leftwardly in Figure 1, by the collar 63 on shaft 1, whenever the collar is pulled leftwardly by centrifugal action of the governor weights 64, the latter being fulcrumed on pivot pins 65 fixed on shaft 1, there being a coil spring 66 interposed between the pins 65 and the collar 63 to move the latter rightwardly in Fig. 1, when the speed of shaft 1 diminshes below the critical speed, which should be a high speed beyond which the shaft 1 will not be permitted to revolve. It may be noted here that this governor control of control valve 51 may be the only control of the fuel pumping action or this governor control may be omitted and the control be only that provided by the control piston 52 and its associated control means, as hereafter described.

The passage 67 in cover plate 6 connects the common fuel chamber 45 with the control port 54, and this passage 67 also has connected therewith, communicating therewith the air trap chamber 68 formed in the trap 69 which is screwed into the cover plate 6 to close an opening to passage 67. This air trap chamber 68 is vertically positioned so that a small amount of air may be trapped in its upper end when liquid fuel is under pressure in passage 67 and common fuel chamber 45, the function of this air trap being to equalize the fuel pressure as provided by the pumping action of pump pistons 13, so that this pressure may always under normal action be substantially even so that fuel delivery to metering ports 40 is always in the normal cycle of even pressure, and also to hold this pressure substantially even and permit of the slight liquid movement necessary to open the control valve 51, the liquid fuel being substantially incompressible. The control valve 51 may be of any type such as the needle valve of graduated diameter to provide for the variable control action for variable release of liquid fuel to the by-pass conduit.

Referring now to Figure 5, this figure shows a manual control means for use in connection with the metering and pumping unit, as one type of such control for the metering and pumping unit. A casing 70 has formed therein a pump cylinder 71 in which a reciprocable piston 72 reciprocates under movement of a coil spring 72a thrusting it outwardy and a foot pedal manually moved upon its bracket pivot 73, to thrust it inwardly. The foot pedal lever, denoted 74, by coil spring 75 is normally held from contact with piston 72.

The pump cylinder 71 receives liquid as an oil from conduit 76 under control of check valve 77, and thereby from supply tank 78, and the pump cylinder 71, under the manual pumping action delivers the oil to chamber 79 as controlled by check valve 80. The chamber 79 is in free communication with control conduit 56, and restricted communication with the by-pass conduit 81, the latter communication being stopped only when the control by-pass valve 82 is closed on its seat in conduit 81, by pressure upon the head 83 from fulcrumed lever 84. The latter is adapted to be pulled at its opposite end to pivot on pivot 85 by means of cable 86 attached to a hook 87 (Figure 6), the hook 87 being contacted and pulled only when the manual vehicle brake lever 88 is manually released so that it is raised by its stronger coil spring 89. The control by-pass valve 82 is normally lifted from its seat by a light coil spring 90 so that thereby, whenever the foot brake pedal lever 88 is depressed to brake the vehicle, the pull on cable 86 is released and the control by-pass valve 82 is permitted to rise thereby releasing the pressure of oil in the control conduit 56 and thereby also permitting the control valve 51 to be unseated. The by-pass conduit 81 is always in communication with the supply tank 78, except when pressure therein, is less than a so-called idling pressure, as controlled by a pressure responsive piston 91 under pressure of light spring 92 normally seating valve 93 on its seat to close the passage. The piston 91 moves to open valve 93 from its seat and release oil to supply tank 78 when the pressure in by-pass conduit 81 is greater than the pressure determined by spring 92, which pressure should be only such as to provide for idling fuel pressure to the engine. This pressure for idling may be adjusted or released to stop the engine, by stopping fuel flow to the engine, by manually unscrewing partially the screw cap 94 to lower the pressure of spring 92.

The control unit described is shown as one type of control for the pressure of the control check valve 51 on its seat to control the pressure of liquid fuel in the common chamber 45, and it is contemplated that any other means may be used for control of this pressure in common chamber 45. The latter may otherwise be called a common fuel rail. Referring to Figure 6, the fuel metering and distribution unit is generally designated M and the control unit is generally designated X. The internal combustion engine therewith associated (Fig. 6) is generally designated E, and the fuel injection nozzles are each designated $E^1$. The latter may each deliver directly to the individually associated engine cylinder of engine E, or they may each deliver to individual passages associated with each cylinder or with pairs of cylinders for injection of the fuel to air passages delivering air for combustion in the cylinders of engine E.

Having described in detail the construction, the operation of the fuel metering and control means is now described as follows: The engine E may be a four-cycle or two-cycle engine, or operate on any cycle, and the fuel distribution is timed to be in accord with that cycle so that a fuel delivery is once for each cycle of combustion for each combustion chamber. The fuel metering and distribution unit M is in the illustration shown, Fig. 6, placed to have its element 2 placed in an internal gear element $E^2$ of the engine E, so that the shaft 1 of unit M is driven at the same speed as the crank shaft $E^3$ of engine E, and the engine may then be inferred to be a two cycle engine. The unit M receives liquid fuel by supply conduit 60, and distributes the fuel by distribution conduits 39, to each injection or discharge nozzle $E^1$, individually. The nozzles $E^1$ may be of any type, such as used with injection type engines, preferably opened by the pressure of the fuel in the nozzle. There are many of such nozzles, of various kinds, and the nozzle is therefore only diagrammatically illustrated. The engine crank shaft is started by any starting means, as commonly used, but not illustrated, and when the engine crank shaft and shaft 1 are so started in revolution, the pump pistons 13 will individually draw liquid fuel from annular supply conduit 59 and deliver it as pumped to the common chamber 45, where the pressure of fuel will accumulate until the pressure applied to the control piston 52 and thereby to control valve 51 by the control unit X, by the operator, is overcome whatever that pressure may be. It should be noted here, that preferably the pumping pistons 13 should have such a total capacity in relation to the engine E, and its maximum requirement of fuel per cycle, of revolution of crank shaft $E^3$, that that total capacity is just equivalent to that total requirement per cycle under maximum power output, allowing for any leakage, and thus at any time, whatever the pressure of control from unit X, that maximum requirement will not be exceeded. The operator by repeated depressions of the foot pedal lever of unit X (lever 74) will pump oil into the control conduit 56 until he has accumulated in the cylinder of control piston 52 a pressure sufficient to hold control valve 51 on its seat to maintain the required pressure of liquid fuel in common chamber 45. The by-pass conduit 81 of unit X is now closed, as foot brake lever is released. Suppose the operator has the maximum required pressure in conduit 56, then the control valve 51 does not open at all, and the pump pistons 13 deliver the maximum flow fuel to common chamber 45. This flow of fuel is now under a pressure in chamber 45 which pressure will depend to some extent on the speed of revolution of crank shaft $E^3$, and the fuel under pressure will issue from common chamber 45 through metering ports 40, substantially unrestrictedly, except as restricted by the cross-sectional area of the ports 40, and this restriction will not be such as to prevent delivery of the maximum required flow of fuel under all contemplated conditions of operation, assuming the accumulated pressure in common chamber 45 is sufficient.

As fuel issues to any plunger cylinder 10 from its associated metering port 40, the fuel if the plunger 12 is not in its pressure distribution phase, will by its pressure force the associated plunger 12 radially inwardly of casing 9 towards the shaft 1, and the movement of the plunger towards shaft 1 will be exactly commensurate with the flow of fuel into the cylinder 10 from its metering port 40, and it will not be more than this flow of fuel requires. In the cycle of rotation of shaft 1, the eccentric 14, at or just slightly prior to the predetermined moment for the fuel injection, as determined by the construction, which in Diesel type engines should be substantially at maximum compression in the engine cylinder, contacts the plunger 12 associated with the engine cylinder or cylinders of a unit where there is to be fuel delivery, and forcibly and very quickly forces the plunger into the cylinder 10 associated, radially outwardly from shaft 1, to highly compress the fuel and cause delivery through the discharge port by the associated check valve to the nozzle $E^1$ associated, whereby fuel injection or discharge occurs. The period of contact may in Diesel type engines be not more than say fifteen to thirty degrees of the rotation of shaft 1, and the fuel discharge for the nozzle $E^1$ is therefore of not longer duration. Immediately after this discharge, the metering port 40 resumes discharge of fuel from common chamber 45, if that discharge has been interrupted during the fifteen degree period. There will be interruption of discharge from metering port 40, associated with any plunger 12 in the event that the pressure in common chamber 45 is not at least the equivalent of or greater than the pressure required for fuel injection through the nozzle $E^1$, but there need not be this interruption if the pressure in common chamber 45 is greater than this fuel injection pressure. This will depend in any construction on the relative pressures of injection or fuel distribution, the size of the metering ports 40, and the control pressures.

In cyclic order, each plunger 12 will be contacted and its movement will discharge the fuel from its cylinder 10 through its associated nozzle $E^1$ and after the discharge the metering of fuel to the cylinder 10 will be resumed and be continued through at least all the cycle except the period of injection, if not the entire cycle.

Now, assuming that the operator desires to control the fuel flow so as to not have maximum engine power output, he does not pump the maximum pressure in control conduit 56, or if he has done so, he must slightly depress the foot pedal brake to thereby release the hook and cable of the by-pass valve for passage 81, whereupon the valve 82 will be permitted to rise under impulse of the light spring 90, and some pressure of oil in control conduit 56 will then be released, so that the control pressure in conduit 56 is then lower, than the maximum required pressure, and the pumping capacity of pistons 13 then delivers some fuel to be metered through ports 40, and some to be discharged back through the by-pass to the fuel supply conduit, whereupon there is a lesser discharge of fuel per cycle. The foot brake pedal does not apply brakes until there is first the release of the oil pressure from conduit 56. The operator may by his manipulation of the pump of unit X apply any pressure he desires in control conduit 56, and thereby accomplish any variation of the discharge of fuel from the metering ports 40, down to that minimum delivery required for engine idling, and he may further diminish the delivery for stopping, by release of pressure by the screw cap 94, or any other means, as by discontinuing the supply of ignition sparks to the cylinders in an Otto type engine if the engine E is such.

It is to be observed that, during all of the cycle of shaft 1 the plungers 12 have no pressure applied thereto to restrict their movement radially inwardly toward shaft 1, and that accordingly this movement is not restricted during the period of the cycle for reception of fuel into cylinders 10. Thus the pressure of liquid fuel in common chamber 45, to accomplish the fuel delivery to cylinders 10, need not be more than a few pounds or even less depending on the tightness of the fit of plungers 10 or their packing. On the other hand the maximum pressure of delivery to cylinders 10 from common chamber 45 may rise to any pressure, even to as much as ten thousand pounds, if the construction be adapted for such high pressure, so that there is a very wide range of pressures available as the predetermined range of pressures for the common chamber 45. This available wide range of pressures for chamber 45 permits of a sufficiently fine or small cross-sectional area of the metering ports 40, so that these ports perform their function of metering the fuel in like quantity to each cylinder 10, which may be called a receiving chamber, under all conditions of operation of engine E, namely low or high speed and low or maximum power per cycle of revolution. Because of this permissible wide range of pressures, the ejection of fuel from the common chamber 45 through the metering nozzles 40, in exactly like quantity through each at all times or through a cycle, and under all conditions of operation of the engine E, is possible of achievement in any construction, whatever the size or power of the engine or its contemplated speed. If the pressure in chamber 45 exceeds the nozzle injection pressure by nozzles E¹, the ejection from chamber 45 through metering ports 40 may be continuous, but if it does not exceed the nozzle injection pressure, the ejection from chamber 45 through ports 40 may be continuous except for the slight interruption during the fifteen degree nozzle injection period. The elements of my device are preferably assembled in metering unit M, as shown, but they are not necessarily so assembled in one unit. I especially contemplate that my metering unit may be used with Otto cycle engines as well as Diesel engines, the fuel distribution being either directly to the engine cylinder or to any associated chamber, as where there are a multiple number of chambers for fuel injection to air, as is sometimes used. While I have shown particular devices and combinations of devices in the illustration of my invention, I contemplate that other detailed devices and combinations of devices may be used in the realization of my invention, without departing from the spirit and contemplation thereof.

What I claim is:

1. In a fuel distributing means for internal combustion engines, a common fuel pumping means actuated cyclically and a common fuel conduit into which said pumping means delivers the fuel and means for increasing the pressure or diminishing the pressure maintained in said common fuel conduit by said pumping means, and in combination therewith a distributing means comprising a multiple number of fuel receiving chambers, a fuel metering passage for each receiving chamber delivering thereto from the common fuel conduit, said fuel metering passages being each of predetermined like flow capacity, a pressure responsive element for each receiving chamber movable therein to diminish the receiving chamber and freely movable oppositely and unrestrictedly in intermediate periods to enlarge the receiving chamber in proportion to the volumetric flow from the associated fuel metering passage, an actuation means actuated cyclically to thrust the pressure responsive elements in cyclic order in their respective chambers for diminishment thereof, and conduits one for each receiving chamber for delivery from the receiving chamber.

2. In a fuel distributing means for internal combustion engines, a common fuel pumping means actuated cyclically and a common fuel conduit into which said pumping means delivers the fuel and means for increasing or diminishing the pressure maintained in the said common fuel conduit by said pumping means, and in combination therewith a distributing means comprising a multiple number of fuel receiving chambers, a fuel metering passage for each receiving chamber delivering thereto from the common fuel conduit, said fuel metering passages being each of predetermined like flow capacity, a non-return valve means for each fuel metering passage interposed between the metering passage and the said common fuel conduit, a pressure responsive element for each receiving chamber movable therein to diminish the receiving chamber and freely movable oppositely and unrestrictedly in the intermediate periods to enlarge the receiving chamber in proportion to the volumetric flow from the associated fuel metering passage, an actuation means actuated cyclically to thrust the pressure responsive elements in cyclic order into their respective chambers for diminishment thereof, and conduits one for each receiving chamber for delivery from the receiving chamber.

3. In a fuel distributing means for internal combustion engines, a common fuel pumping means actuated cyclically in accordance with the cycle of the engine and a common fuel conduit into which said pumping means delivers the fuel, individual fuel conduits and means for distributing the fuel from said common fuel conduit to the individual fuel conduits, and in combination therewith a means for variation of the pressure maintained in said common fuel conduit, the said last named means comprising a fuel release port to discharge fuel from said common fuel conduit, a valve means for said fuel release port and means for control of said valve means to enlarge, diminsh or close the fuel release port the said past named means being operable in functional actuation of the fuel distributing means.

4. In a fuel distributing means for internal combustion engines, a common fuel pumping means actuated cyclically in accordance with the cycle of the engine and a common fuel conduit into which said pumping means delivers the fuel, individual fuel conduits and means for distributing the fuel from said common fuel conduit to the individual fuel conduits, and in combination therewith a means for variation of the pressure maintained in said common fuel conduit, the said last named means comprising a fuel release port to discharge fuel from said common fuel conduit, a valve means for said fuel release port, means for the control of said valve means including a pressure responsive element in coaction with said valve means to yieldably hold said valve means closed against said fuel release port, and means for alteration of the yieldable pressure of a yieldable pressure application means against said pressure responsive element the said last named means being operable in functional actuation of the fuel distributing means.

5. In a fuel distributing means for internal combustion engines, a common fuel pumping means actuated cyclically in accordance with the cycle of the engine and a common fuel conduit into which said pumping means delivers the fuel, individual fuel conduits and means for distributing the fuel from said common fuel conduit to the individual fuel conduits, and in combination therewith a means for variation of the pressure maintained in said common fuel conduit, the said last named means comprising a fuel release port to discharge fuel from said common fuel conduit, a valve means for said fuel release port, means for the control of said valve means including speed controlled means operated in cyclic unison with said fuel pumping means to move said valve to open said release port when a determining speed is exceeded and to close said release port when the speed is under said determining speed.

6. In a fuel control means for internal combustion engines, a fuel supply controlling element incorporated with a fuel delivery means for increasing or diminishing the flow of fuel through the fuel delivery means, a means for controlling said controlling element including a pressure responsive element in actuable relation therewith, said pressure responsive element being movable into or out of a pressure chamber, and manual means for increasing or diminishing the pressure of fluid in said pressure chamber, said last named means including a pumping means adapted for manual actuation and means for supplying fluid to said pumping means and for delivering fluid from said pumping means to said pressure chamber and means for release of fluid from said pressure chamber.

7. A fuel distributing means for internal combustion engines comprising; a multiple number of fuel receiving chambers and a multiple number of plungers movable into or out of said receiving chambers one of said plungers being in association with each of said receiving chambers, means forcibly injecting liquid fuel in like volume per unit of time to each of said receiving chambers, fuel conduits associated individually with each of said receiving chambers for delivery of fuel therefrom, and a means for moving said plungers into their respective chambers in cyclic order, said last named means comprising; a rotatable element for actuation in cyclic order, an eccentric element mounted on said rotatable element, a bearing race mounted on said eccentric element with roller elements interposed, the said bearing race being thereby mounted in the field of actuation of said plungers to produce thrust of said plungers in cyclic order into their respective chambers during a minor portion of the cycle of rotation of said eccentric element and to relieve said plungers of restriction by said bearing race during the balance of said cycle of rotation of said eccentric element, and a connecting means between said eccentric element and said rotatable element to induce rotation of said eccentric element with said rotatable element, and a speed responsive means rotatable in association with said rotatable element and to which said connecting means is responsive to advance or retard said eccentric element relatively to said rotatable element.

8. A two stage fuel delivery system for internal combustion engines comprising, in combination, a variable pressure fuel chamber which is common to the system and a means for delivering fuel thereto in variable quantity to produce a variable pressure of fuel therein, a multiple number of fuel receiving chambers each having individually a discharge conduit for delivery of fuel therefrom independently of the others and each having a plunger reciprocable therein to increase or diminish the volumetric capacity of said receiving chamber, a fuel passage for each said receiving chamber all of said fuel passages discharging from said variable pressure fuel chamber to said receiving chambers each of said fuel passages being in conductive capacity exactly equal to each of the others and permitting flow from said variable pressure fuel chamber according to the flow inducement produced by the existent pressure in said variable pressure fuel chamber, a means for actuation in cyclic order to induce inward strokes of said plungers in their respective receiving chambers in cyclic order in relatively brief injection periods but formed in relation to said plungers to permit movement of each of said plungers unrestrictedly thereof in alternate longer fuel induction periods of said receiving chambers in proportion to the volumetric flow from the associated fuel passage.

9. In a fuel distributing means for internal combustion engines, a variable pressure fuel chamber which is common to the fuel distributing means, a means for supplying fuel in variable quantity to the variable pressure fuel chamber to produce a variable pressure of fuel in said chamber and means for control of said means for supplying fuel to cause changes of said pressure; a multiple number of fuel receiving chambers each having individually a discharge conduit for discharge of fuel therethrough independently of the others, a multiple number of plungers each reciprocable in an associated one of said fuel receiving chambers to increase or diminish the volumetric capacity of the receiving chamber, a multiple number of fuel passages each connecting one fuel receiving chamber with said variable pressure fuel chamber each fuel passage being in conductive capacity exactly equal to each of the others and permitting flow from said variable pressure fuel chamber according to the flow inducement produced by the existent pressure in said variable pressure fuel chamber, a means for actuation in cyclic order to induce inward strokes of said plungers in their respective receiving chambers in cyclic order in relatively brief injection periods but formed in relation to said plungers to permit movement of said plungers unrestrictedly thereof in alternate longer fuel induction periods of said fuel receiving chambers in proportion to the volumetric flow from the associated fuel passage.

ADOLPHE C. PETERSON.

REFERENCES CITED

The following references are of record in the file of this patent:

UNITED STATES PATENTS

| Number | Name | Date |
| --- | --- | --- |
| 1,825,417 | Peterson | Sept. 29, 1931 |
| 1,971,601 | Dilg | Aug. 28, 1934 |
| 2,001,126 | Cummins | May 14, 1935 |
| 2,007,197 | Hedblom | July 9, 1935 |
| 2,052,737 | Zubaty | Sept. 1, 1936 |
| 2,130,299 | Ernst | Sept. 13, 1938 |
| 2,160,735 | Hoffer | May 30, 1939 |
| 2,177,120 | Schaeren | Oct. 24, 1939 |
| 2,214,390 | Wahlmark | Sept. 10, 1940 |
| 2,215,911 | Peterson | Sept. 24, 1940 |
| 2,295,833 | Deschamps | Sept. 15, 1942 |
| 2,353,188 | Roosa | July 11, 1944 |
| 2,366,979 | Obecny | Jan. 9, 1945 |
| 2,393,175 | Laskey | Jan. 15, 1946 |